Figure 1:
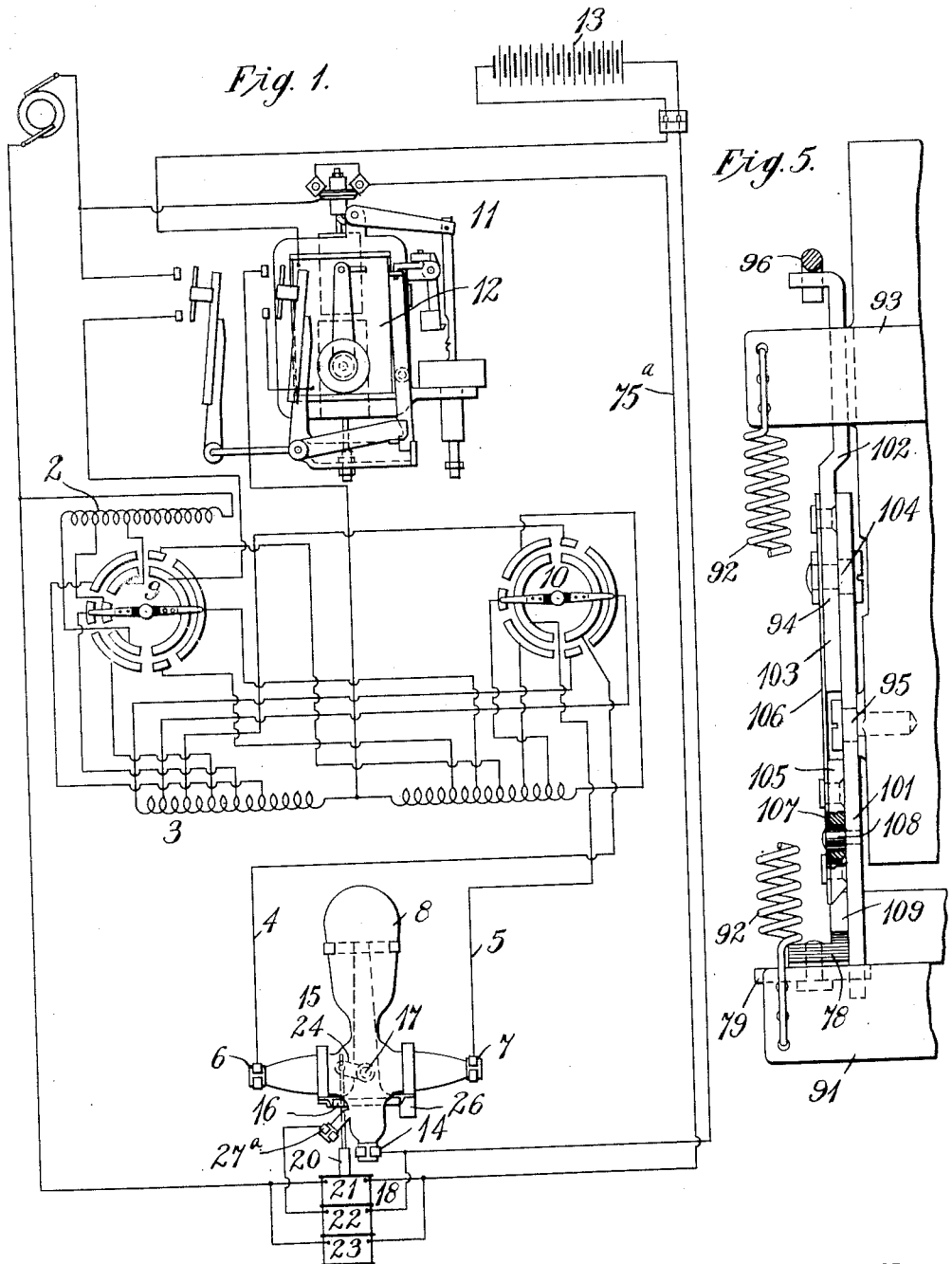

H. M. SCHEIBE.
SYSTEM OF ELECTRIC CURRENT DISTRIBUTION.
APPLICATION FILED OCT. 8, 1910.

1,036,914.

Patented Aug. 27, 1912.

3 SHEETS—SHEET 2.

WITNESSES:

INVENTOR
Harold M. Scheibe
BY
Keley G. Carr
ATTORNEY

H. M. SCHEIBE.
SYSTEM OF ELECTRIC CURRENT DISTRIBUTION.
APPLICATION FILED OCT. 8, 1910.
1,036,914.
Patented Aug. 27, 1912.
3 SHEETS—SHEET 3.
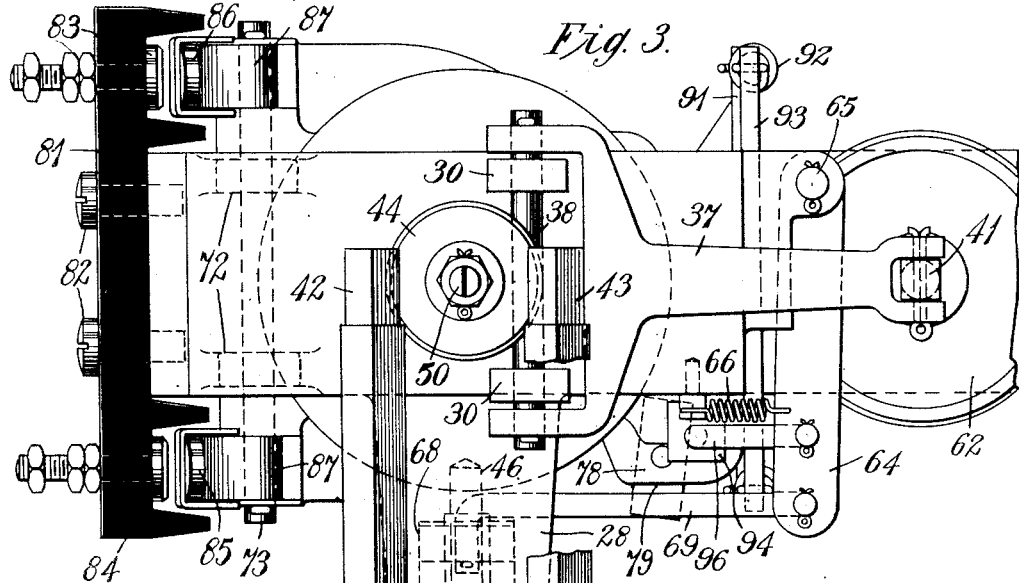
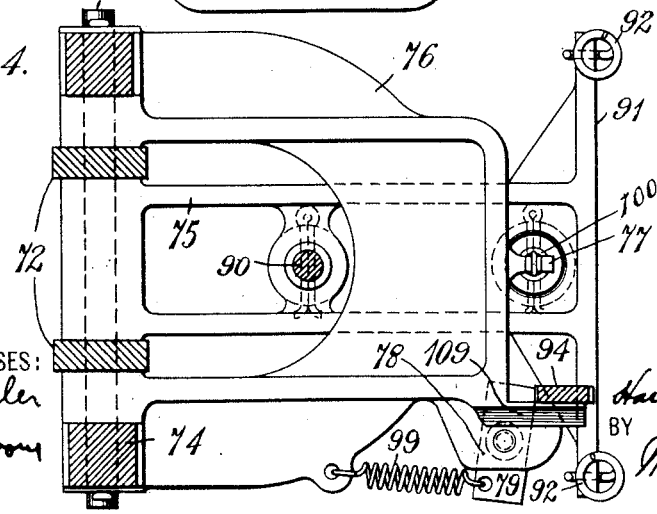

UNITED STATES PATENT OFFICE.

HAROLD M. SCHEIBE, OF WILKINSBURG, PENNSYLVANIA, ASSIGNOR TO WESTING-
HOUSE ELECTRIC AND MANUFACTURING COMPANY, A CORPORATION OF PENN-
SYLVANIA.

SYSTEM OF ELECTRIC-CURRENT DISTRIBUTION.

1,036,914.        Specification of Letters Patent.        Patented Aug. 27, 1912.

Application filed October 8, 1910. Serial No. 586,079.

*To all whom it may concern:*

Be it known that I, HAROLD M. SCHEIBE, a citizen of the United States, and a resident of Wilkinsburg, in the county of Allegheny and State of Pennsylvania, have invented a new and useful Improvement in Systems of Electric-Current Distribution, of which the following is a specification.

My invention relates to systems of electric current regulation and distribution and it has special reference to such systems as embody an alternating current source of energy, secondary electric batteries or accumulators and an interposed vapor rectifier.

One object of my invention is to provide a system of the class above indicated that shall be particularly reliable in operation and adapted for general use where a skilled attendant is not available.

Another object is to provide an automatic governor which shall be structurally compact and positive in operation for controlling the starting and stopping of a vapor rectifier and for automatically interrupting both the alternating and the direct current circuits of the system under predetermined abnormal conditions.

In Patent No. 959,613, granted May 31, 1910, to Westinghouse Electric & Manufacturing Company, upon an application filed by me, is illustrated and described a relay switch or governor for vapor rectifiers used for battery-charging purposes. The relay switch is adapted to re-start the rectifier upon the renewed application of alternating current energy to the supply circuit after a temporary interruption. However, although the switch automatically re-starts the rectifying process upon its accidental discontinuance, it, nevertheless, allows the rectifying process to stop when the battery is charged to a predetermined degree.

According to my present invention, I so construct the relay switch or governor as to not only accomplish the above mentioned functions, but also to automatically interrupt both the alternating and the direct current circuits of the system, in case the current traversing the direct current circuit exceeds a predetermined amount. Various conditions may cause an overload current which, if permitted to continue, would cause a very rapid deterioration of the vapor rectifier, for example: The direct current circuit of the rectifier may be accidentally short-circuited, or conditions may arise which would produce a short-circuit within a rectifier when the direct current circuit is connected to the terminals of a storage battery. Should any one of these abnormal conditions exist, it is highly desirable to immediately interrupt, not only the direct current circuit of the rectifier, but also the alternating current supply circuit.

Figure 2:
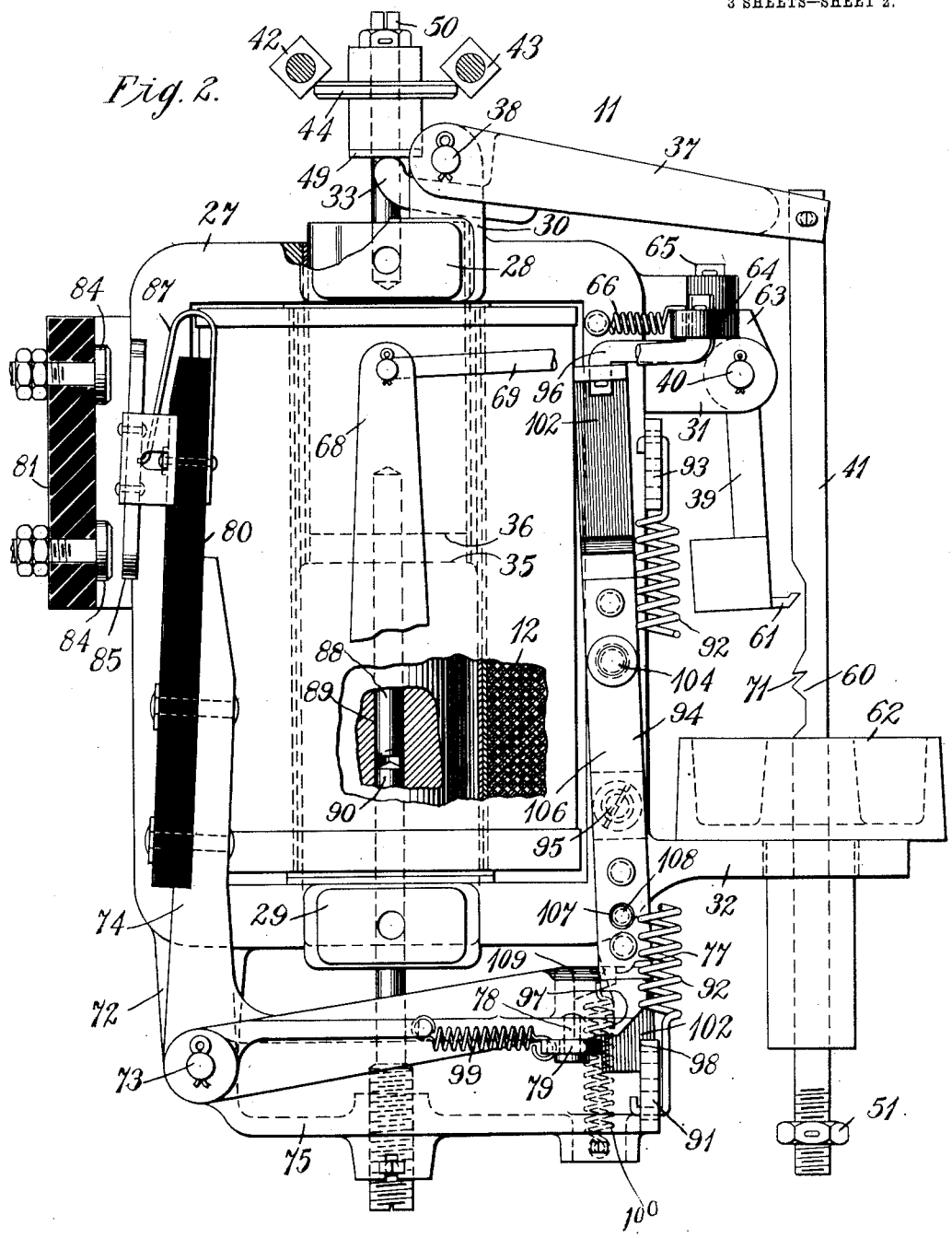

Figure 1 of the accompanying drawings is a diagrammatic view of a battery-charging system embodying my invention. Figs. 2 and 3 are, respectively, a front elevation, partially in section, and a plan view of a relay switch or governor constructed in accordance with my invention, and Figs. 4 and 5 are fragmentary views which disclose, more fully, certain parts of the structure shown in Figs. 2 and 3.

Referring to Fig. 1 of the drawings, alternating current energy may be supplied from any suitable source, such as generator 1, through a reactance 2, an auto transformer 3 and circuit conductors 4 and 5, to the terminals 6 and 7 of the vapor rectifier 8. Regulating dials 9 and 10 are adapted to so vary the circuit connections of the auto transformer 3 as to adjust the alternating current voltage impressed upon the rectifier. A relay switch 11 is introduced into a circuit conductor $75^a$ which supplies energy for tilting the rectifier bulb, and its coil 12 is connected in series with the direct current circuit of the rectifier, which may include a storage battery 13 or some other suitable load, one terminal of the load being connected to the middle point of the auto transformer 3 and the other being connected to the direct current terminal 14 of the rectifier bulb. The rectifier comprises a substantially cruciform bulb 8, a supporting frame 16 therefor which is pivotally mounted on a shaft 17, and a starting or tilting magnet 18 having a movable core member 20 and magnet coils 21, 22 and 23. The frame 16 is provided with a crank projection 24 which is connected to the movable core member 20, the arrangement of parts being such that, when the coils 21 and 23 are energized, the rectifier will be so tilted, in opposition to a weight 26, that the mercury within the rectifier bulb will form a circuit connection between the direct current terminal of the rectifier and a starting terminal $27^a$, in a well known manner.

Referring to Figs. 2 to 5, inclusive, of the drawings, the relay switch 11, which is here shown on a larger scale, comprises a substantially rectangular magnetizable frame 27 having lugs 28 and 29 projecting laterally from its respective ends, ears 30 on its upper end and ears 31, at one side, near its upper end, a bracket 32 on one side of coil 12, stationary and movable core members 35 and 36, a lever 37 fulcrumed on a shaft 38 that is supported by the ears 30, a latch arm 39 pivotally suspended from the ears 31 by a pin 40, a weight-bearing rod 41 pivotally suspended from the outer end of the lever 37, stationary contact terminals 42 and 43 and a movable contact member 44 that is operatively connected to the core member 36. The frame 27 is fastened to a plate or slab 45 by bolts 46 which extend through the slab and are screw-threaded into the lugs 28 and 29. The stationary contact terminals 42 and 43 are provided with shank projections 47 which extend through the slab 45 and are screw-threaded to receive nuts 48. The inner end of the lever 37 is provided with a bifurcated projection 33 which is adapted to engage the under side of washer 49 on the rod 50 which projects from the core member 36 in order that the weight of the rod 41 may normally tend to move the bridging contact member 44 into engagement with the stationary contact terminals 42 and 43. The rod 41 is provided with a notched projection 60 which is engaged, under predetermined conditions, by a finger 61 at the lower end of the arm 39. A floating weight 62 is loosely mounted on the rod 41 above the bracket 32, upon which it rests, except when the magnet winding 12 is energized to a predetermined degree. The arm 39 is provided with a projection 63 to be engaged by a lever 64 which is pivotally mounted on a stationary shaft 65, the lever being normally in such position that the arm 39 is free to assume the position that is determined by its center of gravity. The lever 64 may be rotated, in opposition to a spring 66, by means of a handle grip 67 which acts through a lever 68 and a connecting link 69, the handle being attached to the outer end of a shaft 70 which projects through the plate or slab 45 and carries the lever 68 at its inner end. The arm 39 is so formed that the finger 61 tends to engage the notch 71 in the projection 60, but the contour of the projection is such that the finger will pass over the notch, if the rod 41 is actuated rapidly in either direction. A nut 51 on rod 41 is adapted to engage the lower end of the floating weight 62 and to lift this weight from the bracket 32 after the movable core member of the electro-magnet has moved through a portion of its travel, and the arrangement of parts is such that the finger 61 comes into engagement with the notch 71 at this point. By this means, the weight rod 41 is latched, either when the electro-magnet is energized by a current which is less than the predetermined value, or when the magnet winding is partially de-energized, so that the weight is able to separate the stationary and movable core members and the weight of rod 41 and other parts is not sufficiently heavy to continue the movement and to close the relay switch.

In addition to the parts above described, the relay switch is provided with downwardly extending lugs 72 which support a horizontal shaft or pin 73 on which a bell crank lever 74 and an arm or lever 75 are pivotally supported. The bell crank lever 74 comprises a yoke or U shaped member 76 having a hooked projection 77 (see Fig. 4), and a lug 78, to which a latch 79 is pivotally secured and a pair of upwardly extending arms to which insulating rods 80 are respectively secured.

A stationary contact-bearing member 81 which consists of an insulating block, is secured to the frame 27, on the opposite side from the parts 39 and 41, by means of screws 82, the length of the block being such that the stationary contact members 83 and 84, which are secured to its ends, are located outside of the front and back surfaces of the frame. The stationary contact members are arranged in pairs on each end of the block 81 and are respectively bridged by movable contact members 85 and 86. These movable contact members are respectively secured to the upper ends of the insulating rods 80 by lost motion connections and are normally separated from the rods, as far as the connection will permit, by springs 87 which are substantially U-shaped, as shown in Fig. 2.

The arm or lever 75 is mounted on the pin 73, between the lugs 72, while the bell crank lever 74 is bifurcated and is mounted on pins outside of the lugs, as shown in Fig. 4. The arm 75, however, is beneath the yoke 76 of the bell crank lever, so that upward movements of the arm are transmitted directly to the bell crank lever, while downward movements of the arm tend to separate it from the yoke. Such downward movements of the core member 36 as accompany the normal operation of the relay switch, do not affect the arm 75, since there is no positive connection between the two parts, but if the coil 12 is traversed by abnormally large currents, the core member 36 will be forced downwardly to such an extent that the lower end of a rod 88, which is secured to the core member 36 and extends downwardly through a hole 89 in the stationary core member 35, engages the upper end of a rod 90 which is supported, at its lower end, by the arm 75.

The outer end of the arm 75 is provided with lateral projections 91, to which helical springs 92 are secured. These springs are connected at their opposite ends, to a cross strip 93, which is affixed to the frame 27, and act on the arm 75 in opposition to the movable core member 36 of the magnet. In fact, under normal conditions, they produce a rotation of the bell crank lever 74 which closes the circuit interrupter, forcing the movable contact members 85 and 86 into engagement with the stationary contact members 84 and 88.

In order to make the action of the circuit interrupter positive, and to avoid producing destructive electric arcs between the contact members whenever the arm 75 is moved downwardly, even to a slight degree, I provide a lever 94 which is pivoted at 95 on the frame 27.

In order to avoid the possibility of the circuit interrupter being held closed under overload conditions, the lever 94 is preferably composed of two parts 101 and 102, as shown in Fig. 5. The upper part 102 is connected to lever 64 by a link 96 and is provided with an offset projection 103, to which the lower part 101 is pivotally connected at 104. In order to make the two parts operate together, under normal conditions, a strip 105, which is connected to the offset projection 103 by a flat spring 106, is provided with a hole 107 which is normally engaged by a pin projection 108 of the lower part 101. The lower extremity of the strip 105 is beveled and may be released from the pin 108 to permit an independent movement of the parts 101 and 102, by an upward movement of the yoke 76, which is provided with a pawl 109, the upper end of which is beveled to engage the beveled end of the strip 105. The lower member 101 of the lever 94 is provided with notches 97 and 98. The arrangement of parts is such that the spring 66, which acts on the lever 64, tends to hold the lower end of the lever 94 in engagement with the projection 91 of the arm 75. When the projection 91 engages the notch 98 of the lever 94, the springs 92 are under tension and the circuit breaker may occupy its open circuit position, as hereinafter more fully pointed out.

The latch 79 is held in engagement with the lever 94 by means of a spring 99 and if the arm 75 is released from the notch 98, the springs 92 will lift the arm 75 and produce such a rotation of the bell crank lever 74 that the latch 79 will drop into engagement with the notch 97. Under these conditions, the circuit breaker is held closed, irrespective of slight movements of the arm 75. If, however, the projection 91 of the arm is forced downwardly by the action of the electro-magnet until the projection 91 engages notches 98, the spring 66 will produce such movement of the lever 94 as to disengage the latch 79 from the notch 97 and permit a spring 100, which is hooked onto the projection 77 of the yoke 76 and is interposed between the yoke and the arm 75, assisted by the springs 87, to forcibly and positively open the circuit interrupter.

The operation of the systems is as follows: Assuming that the relay switch is open, the circuit interrupter closed and the rectifying process in operation, the circuit connections being as indicated in Fig. 1, and the storage battery only partially charged, if the rectifying process is interrupted, for any reason, such as the interruption of the alternating current supply circuit, the relay switch will, of course, be closed, since the coil 12 will be deënergized by reason of the failure of the current traversing the direct current circuit of the rectifier. An alternating current circuit is therefore completed through the relay switch to the magnet coils 21 and 23 of the magnet 18, the energizing of which will be followed by a tilting of the rectifying bulb. The mercury contained in the bulb will then form a circuit connection between the terminals 14 and 27ª of the rectifier and, by this means, the coil 21 will be short circuited, thereby choking down the magnetization across the air gap between the stationary and movable core members of the magnet and permitting the counterweight 26 to return the rectifier to its normal operating position. The short circuit, referred to above, will thus be interrupted and an electric arc produced, so that the alternating current voltage applied to the rectifier terminals may start the rectifying process, in a well known manner. The action of the starting magnet will obviously be repeated if the rectifier fails to start.

The voltage applied to the rectifier bulb is so proportioned that, when the battery is fully charged, its counter-electromotive force will sufficiently oppose the direct current voltage of the rectifier to interrupt the rectifying process and deënergize the relay switch. This occurs after the current has fallen below a predetermined limit which is not sufficient to keep the relay switch open, in opposition to both of the weights and, consequently, the switch has moved toward its closed position until the weight 62 comes into engagement with the bracket 32, the parts having thus been brought to rest long enough for the projection 61 of the arm 39 to come into engagement with the notch 71. When the bulb drops out, the relay is latched, so that the circuit of the starting device is held open. In order to start the rectifier, it is necessary to release the weight rod 41, which may be accomplished by rotating the handle 67. Thus, it is apparent that the rectifying process may be automatically stopped and prevented from attempting to restart when the current traversing the direct current circuit falls gradually below a predetermined amount, although it will be automatically restarted if the rectifying process is interrupted under other conditions.

As indicated in the diagram of Fig. 1, the two poles of the circuit interrupter are respectively connected in the alternating current supply circuit and in the direct current circuit of the rectifier. The circuit interrupter will, of course, remain closed under normal conditions, but it is possible that, if the rectifier is used for battery charging purposes, the charging plug may be short-circuited, or some other accident may cause a very large current to be drawn from the direct current circuit of the system, in which case, it is desirable to automatically interrupt both the alternating and direct current circuits.

The structure of the relay switch is such, as already described, that, under overload conditions, the movable core member 36 is forced downwardly with sufficient force to, not only bring the rod sections 88 and 90 together, but also to move the arm 75 downwardly in opposition to the action of the springs 92. If this movement is continued, the projection 91 will be brought opposite the notch 98 of the lever 94 and the spring 66 will produce such a movement of the lever as to release the latch 79 from the notch 97 and permit the circuit breaker to open. Under these conditions, the parts of the device will occupy the positions indicated in Figs. 2 to 5, inclusive, of the drawings, and the rectifier will be stopped. In order to restart the rectifier, it is only necessary to rotate the handle grip 67 which, in addition to the functions above set forth, will produce such a movement of the lever 94 in opposition to the spring 66 as to release the projection 91 from the notch 98, thereby permitting the springs 92 to move the arm 75 upwardly and to rotate the bell crank lever 74, thereby closing the circuit interrupter.

It is evidently impossible for an attendant to hold the circuit interrupter closed, under overload conditions, since the pawl 109 tends to disengage the lower part of the lever 94 from the upper part when the breaker is closed and, consequently, there is nothing to prevent the downward action of the electro-magnet from immediately and positively opening the circuit breaker.

Variations in size and arrangement of parts may be effected within the spirit and scope of my invention, and I do not wish to be limited to any specific structure except in so far as limitations are included in the appended claims.

I claim as my invention:

1. A circuit interrupter comprising stationary contact members, a movable contact member, an actuating arm, means acting on the arm tending to close the interrupter, and an electric motor acting in opposition to said means.

2. A circuit interrupter comprising stationary contact members, movable contact members, an arm acting indirectly on the movable member, springs connected to the arm and tending to close the interrupter, and an electro-magnet acting on the arm, under predetermined conditions, in opposition to the springs.

3. A circuit interrupter comprising stationary contact members, a movable contact-bearing member, an actuating arm acting directly on the contact-bearing member in one direction and yieldingly connected thereto in the other, springs acting on the arm and tending to close the interrupter, and an electro-magnet acting on the arm in opposition to the springs.

4. A circuit interrupter comprising stationary contact members, a movable contact-bearing member, an actuating arm acting directly on the contact-bearing member in one direction and yieldingly connected thereto, springs connected to the arm and tending to close the circuit interrupter, an electro-magnet acting on the arm in opposition to the springs, and a latch adapted to engage the arm and hold the springs in tension.

5. A circuit interrupter comprising stationary contact members, a movable contact-bearing member, an actuating arm acting directly on the contact-bearing member in one direction and yieldingly connected thereto, springs connected to the arm and tending to close the circuit interrupter, an electro-magnet acting on the arm in opposition to the springs, and a single latch adapted to engage the contact-bearing members to hold the circuit interrupter closed or to engage the arm and hold the springs in tension.

6. A circuit interrupter comprising stationary contact members, a bell crank lever, movable contact members yieldingly or flexibly secured thereto, an actuating arm pivoted co-axially with the bell crank lever and acting directly thereon in one direction, a spring connecting the bell crank lever and the arm, a second spring acting on the arm and tending to close the circuit interrupter, and an electro-magnet acting on the arm in opposition to the closing spring.

7. A circuit interrupter comprising stationary contact members, a bell crank lever, movable contact members yieldingly secured thereto, an actuating arm pivoted co-axially with the bell crank lever and acting directly thereon in one direction, a spring connecting the bell crank lever and the arm, a second spring acting on the arm and tending to close the circuit interrupter, an electro-magnet acting on the arm in opposition to the closing spring, a latch adapted either to prevent movement of the arm in one direction or to prevent movement of the bell crank lever in the opposite direction.

8. A circuit interrupter comprising stationary contact members, a bell crank lever, movable contact members yieldingly secured thereto, an actuating arm pivoted coaxially with the bell crank lever and acting directly thereon in one direction, a spring connecting the bell crank lever and the arm, a second spring acting on the arm and tending to close the circuit interrupter, an electro-magnet acting on the arm in opposition to the closing spring, a latch provided with a pair of opposed notches, a pawl pivotally mounted on the bell crank lever and adapted to engage one of the notches when the circuit interrupter is closed, said arm being engaged by the opposite notch to hold the closing spring in tension when the electro-magnet has exerted sufficient force to overcome the tension of said spring.

9. The combination with an electro-magnet having a coil and a movable core member, a relay switch actuated by the core member and means dependent upon a predetermined current traversing the coil for holding the switch open, of a circuit interrupter, and means dependent upon a predetermined greater current traversing the coil for actuating the circuit interrupter.

10. A relay switch comprising a movable contact member, an actuating lever therefor, weights suspended from the lever and tending to close the switch, and means dependent upon a predetermined movement of the contact member, from either its open or its closed position for holding the switch in an intermediate open position, of an electro-magnet for actuating the switch, a circuit interrupter, and means dependent upon a predetermined current in the electro-magnet for actuating the circuit interrupter.

11. A relay switch comprising a stationary frame, stationary and movable core members, an opening coil, a lever pivotally mounted on the stationary frame and operatively connected to the movable member of the switch, a rod suspended from the lever and having a notched projection at one side, weights attached to the rod, an arm suspended adjacent to the rod and provided with a finger, a means tending to force the finger into engagement with the notch in the rod, with a circuit interrupter, and means dependent upon an abnormal current in the opening coil for actuating the circuit interrupter.

12. A relay switch comprising a stationary frame, stationary and movable core members, and an opening magnet, mechanical means for holding the switch closed, and means dependent upon a slight energization of the coil for locking the switch in an intermediate open position, of a circuit interrupter, and means dependent upon an abnormal energization of the coil for opening the circuit interrupter.

In testimony whereof, I have hereunto subscribed my name this 24th day of Sept., 1910.

HAROLD M. SCHEIBE.

Witnesses:
R. J. DEARBORN,
B. B. HINES.